(12) United States Patent
Hardy et al.

(10) Patent No.: US 10,989,555 B2
(45) Date of Patent: Apr. 27, 2021

(54) SYSTEM AND METHOD FOR AUTOMATED SEMANTIC MAP GENERATION

(71) Applicant: Robert Bosch GmbH, Stuttgart (DE)

(72) Inventors: Jason Hardy, Union City, CA (US); Felix Geyer, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 16/180,202

(22) Filed: Nov. 5, 2018

(65) Prior Publication Data

US 2020/0141750 A1 May 7, 2020

(51) Int. Cl.
*G01C 21/34* (2006.01)
*G06N 7/00* (2006.01)
*G01C 21/36* (2006.01)

(52) U.S. Cl.
CPC ..... *G01C 21/3492* (2013.01); *G01C 21/3632* (2013.01); *G01C 21/3658* (2013.01); *G06N 7/005* (2013.01)

(58) Field of Classification Search
CPC ............ G01C 21/3492; G01C 21/3632; G01C 21/3658; G06N 7/005
See application file for complete search history.

(56) References Cited

U.S. PATENT DOCUMENTS

| | | | |
|---|---|---|---|
| 10,636,294 B1* | 4/2020 | Gentile | G08G 1/0112 |
| 2010/0321490 A1* | 12/2010 | Chen | G01C 21/32 |
| | | | 348/118 |
| 2012/0053755 A1* | 3/2012 | Takagi | B60W 40/04 |
| | | | 701/1 |
| 2015/0371537 A1* | 12/2015 | Eilertsen | G08G 1/0141 |
| | | | 701/117 |
| 2017/0082454 A1* | 3/2017 | Jurk | G01C 21/20 |
| 2019/0302801 A1* | 10/2019 | Zlot | H04W 4/46 |

* cited by examiner

*Primary Examiner* — Behrang Badii
(74) *Attorney, Agent, or Firm* — Kathy Takeguchi; Maginot, Moore & Beck LLP

(57) ABSTRACT

A system and method for automated semantic map generation includes at least a processing system with at least one processing device. The processing system is configured to generate a probabilistic road model for road elements. The processing system is configured to generate a probabilistic traffic model for the road model. The processing system is configured to perform statistical inference on the road model and the traffic model. The processing system is configured to generate an estimate of a semantic road model based on the statistical inference. The processing system is configured to generate a semantic map that includes the estimate of the semantic road model.

20 Claims, 6 Drawing Sheets

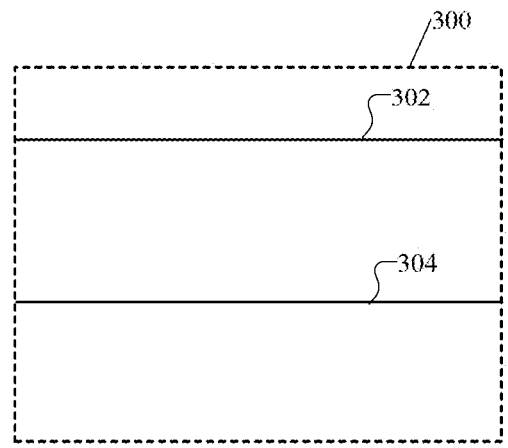
FIG. 3A
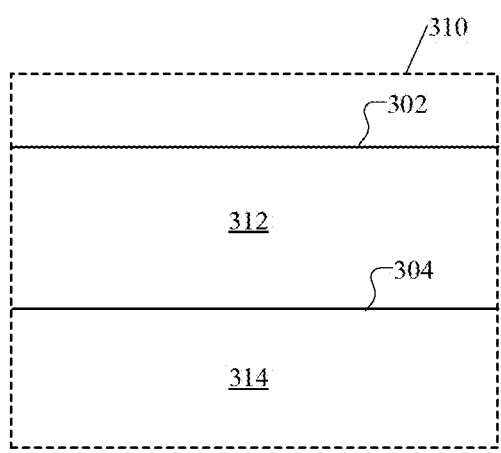 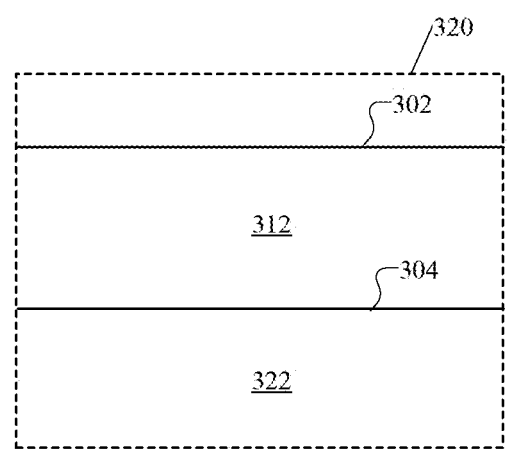
FIG. 3B          FIG. 3C

US 10,989,555 B2

SYSTEM AND METHOD FOR AUTOMATED SEMANTIC MAP GENERATION

FIELD OF THE INVENTION

This disclosure relates generally to maps, and more particularly to automated semantic map generation.

BACKGROUND

In general, some maps include measurable information about the environment. For example, these maps may include the position and shape of lane markings, as well as other features in the environment. In addition to providing indications of roads of a geographic area, these maps may also include some driving information for these roads. However, these maps are typically handcrafted to include this driving information, thereby resulting in labor-intensive and time-consuming processes, as well as some inaccuracies on the maps.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a method includes generating, via a processing system with at least one processing device, a probabilistic road model based on road elements associated with geometric data corresponding to a geographic region. The method includes generating a probabilistic traffic model for the road model. The method includes computing, via the processing system, a statistical inference result based on the road model and the traffic model. The method includes generating, via the processing system, an estimate of a semantic road model based on the statistical inference result.

In an example embodiment, a system includes at least one computer readable medium that stores geometric data, traffic data, and computer readable data. The system includes a processing system communicatively connected to the at least one computer readable medium. The processing system includes at least one processing device. The system is configured to execute the computer readable data to implement a method, which includes generating a probabilistic road model for road elements based on the geometric data. The method includes generating a probabilistic traffic model for the road model. The method includes computing a statistical inference result based on the road model and the traffic model. The method includes generating an estimate of a semantic road model based on the statistical inference result. The method includes generating a semantic map that includes the estimate of the semantic road model.

In an example embodiment, a non-transitory computer readable medium includes computer readable data, which, when executed by a processing system with at least one processing device, is configured to implement a method that includes generating a probabilistic road model for road elements. The method includes generating a probabilistic traffic model for the road model. The method includes computing a statistical inference result based on the road model and the traffic model. The method includes generating an estimate of a semantic road model based on the statistical inference result.

These and other features, aspects, and advantages of the present invention are further clarified by the following detailed description of certain exemplary embodiments in view of the accompanying drawings throughout which like characters or reference numerals represent like parts.

BRIEF DESCRIPTION OF THE DRAWINGS

FIG. 3A is a non-limiting example of a map segment for a geographic region according to an example embodiment of this disclosure.

FIG. 3B is a non-limiting example of a semantic map segment with lane type classification for the geographic region associated with FIG. 3A according to an example embodiment of this disclosure.

FIG. 3C is another non-limiting example of a semantic map segment with lane type classification for the geographic region associated with FIG. 3A according to an example embodiment of this disclosure.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling within the spirit and scope of this disclosure.

Figure 1:
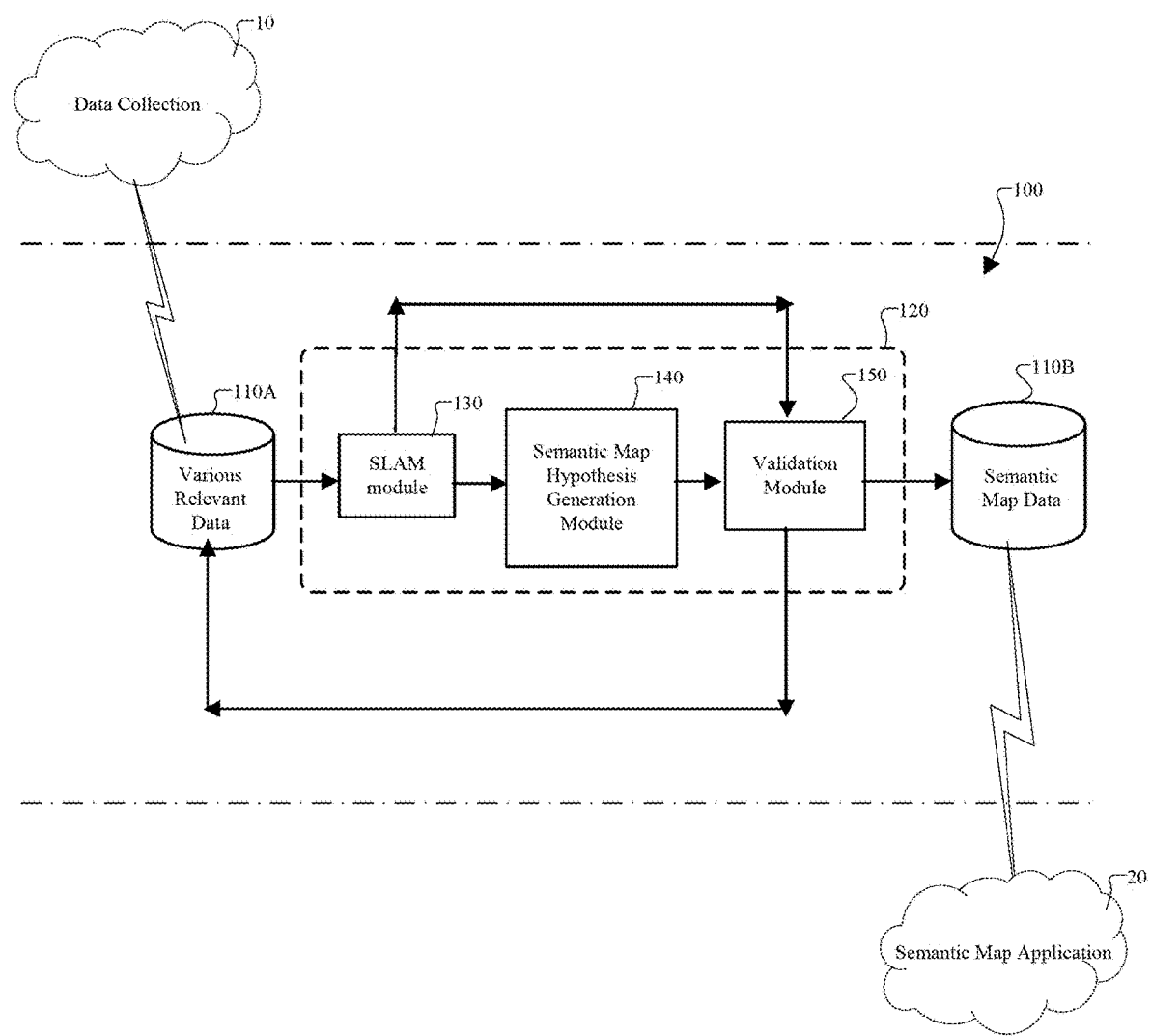
FIG. 1 is a diagram of a system according to an example embodiment of this disclosure.

FIG. 1 is a diagram of a system 100 according to an example embodiment. In an example embodiment, the system 100 includes at least a semantic map generator 120, which is configured to communicate with at least one non-transitory computer readable medium 110. In an example embodiment, the computer readable medium 110 includes one or more electrical, electronic, or computer hardware storage devices, or any combination thereof. Non-limiting examples of a computer readable medium 110 includes any suitable storage device, memory circuits, random access memory (RAM), read only memory (ROM), any computer disk, any type of memory hardware, or any combination thereof. In FIG. 1, the semantic map generator 120 is communicatively connected to computer readable medium 110B and computer readable medium 110B. In an example embodiment, the computer readable medium 110A and the computer readable medium 110B are distinct computer memory entities or different memory portions of the same computer memory entity. For example, the computer readable medium 110 may include computer readable medium 110A and computer readable medium 110B, which are distinct computer memory entities or different memory portions of the same computer memory entity.

In an example embodiment, the computer readable medium 110A includes various relevant data that relates to generating, constructing, or providing a semantic map and/or a semantic road model, as discussed herein. In this regard, for instance, the various relevant data includes data, which is acquired via one or more data collection processes 10 for semantic map generation. Additionally or alternatively, the various relevant data includes data, which is not acquired via one or more data collection processes 10 for semantic map generation, but is relevant to generating an estimate of a semantic road model and/or a semantic map.

In an example embodiment, the data collection process 10 includes obtaining sensor data from various sensors and storing the sensor data on computer readable medium 110A. In this regard, for instance, the various sensors include at least one camera, lidar, radar, GPS, odometry, any suitable sensor, or any combination thereof. In an example embodiment, the sensor data is processed at a central location and transferred to computer readable medium 110A. In an example embodiment, the sensor data includes geometric data. In an example embodiment, the sensor data includes measurable information relating at least to the selected geographic region and/or the environment.

In an example embodiment, the data collection process 10 includes various methods for obtaining and acquiring data that is relevant to the generation of a semantic road model and/or semantic map. For instance, the data collection process 10 includes collecting and recording sensor data via various sensors associated with at least one dedicated instrumented test vehicle or a fleet of vehicles. In an example embodiment, each vehicle is provided with various sensors and driven along preplanned routes in traffic, thereby facilitating the initial task of estimating road elements from geometric data. In this regard, the data collection process 10 advantageously takes into account the driven trajectories of the vehicles together with sensor measurements from the various sensors. In addition, by including preplanned routes and/or driven trajectories, the system 100 is enabled to obtain and process relevant data, which avoids some ambiguities that may otherwise arise when estimating lanes from geometric data (e.g., lane markings) alone.

In an example embodiment, the data collection process 10 includes one or more highly-automated driving vehicles. In an example embodiment, the data collection process 10 includes one or more vehicles with advanced driver assistance systems (e.g., highway assist systems) such that each vehicle is configured to maintain a log of sensor data and transmit the log of sensor data to the system 100 via computer readable medium 110 either via a wireless connection such as an LTE connection, or via a diagnostic port during maintenance. Additionally or alternatively, the data collection process 10 includes one or more human-driven vehicles, which are configured to generate and/or maintain a log of sensor data. As another example, the data collection process 10 includes obtaining traffic data, which is collected via one or more mobile phone applications that collect at least vehicle positions and velocity information using each mobile phone's built-in location services. In this regard, as illustrated by one or more of the non-limiting examples above, the data collection process 10 is advantageous in obtaining a targeted collection of data that is particularly relevant and useful for generating a valid and accurate estimate of a semantic road model and/or semantic map.

Figure 2:
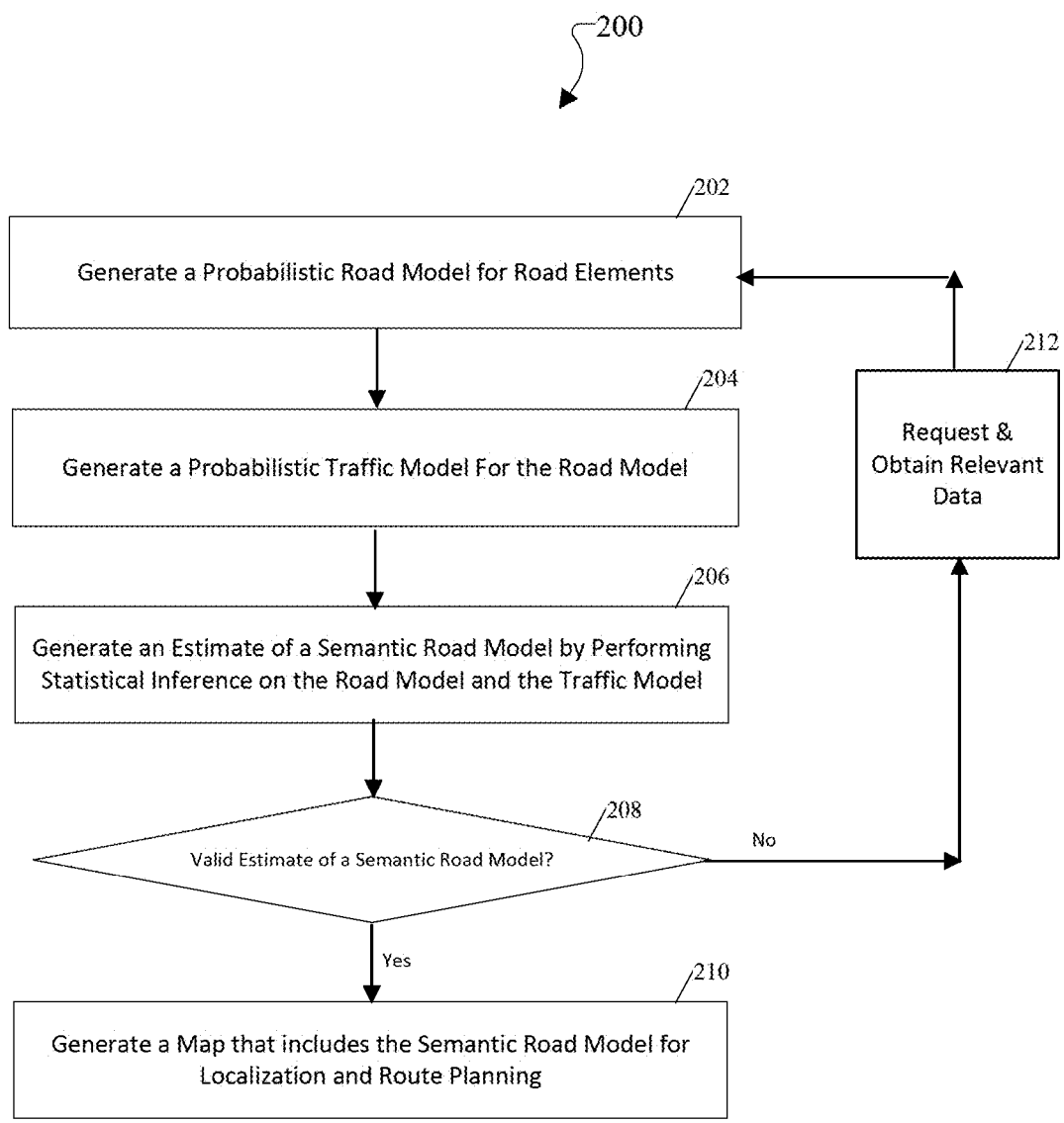
FIG. 2 is a flow chart of a method according to an example embodiment of this disclosure.

In an example embodiment, the semantic map generator 120 is a processing system that includes at least one electrical, electronic, and/or computer processing device. In FIG. 2, for instance, the semantic map generator 120 comprises one or more computer servers and/or computer terminals, which include at least a simultaneous localization and mapping (SLAM) module 130, a semantic map hypothesis generation module 140, and a validation module 150. In an example embodiment, each of the modules of the semantic map generator 120 includes hardware, software, or a combination of hardware and software. In an example embodiment, one or more of the modules of the semantic map generator 120 are remote, local, or a combination thereof with respect to each other and/or the semantic map application 20. Moreover, the semantic map generator 120 is not limited to this configuration of modules, as shown in FIG. 1, but other embodiments include configurations with more modules, less modules, other functional modules, other logical units, or any suitable combination thereof provided that the semantic map generator 120 is configured to achieve one or more of the objectives described herein.

In an example embodiment, the SLAM module 130 is configured to communicate with the computer readable medium 110A. More specifically, the SLAM module 130 is configured to obtain various relevant data from the computer readable medium 110A. In an example embodiment, upon obtaining the various relevant data, the SLAM module 130 is configured to generate road elements, localization features, a map, or any combination thereof by implementing at least one process involving SLAM. In this regard, for instance, the SLAM module 130 is configured to generate a map, which includes lane markings, signs, road boundaries, other SLAM elements, or any combination thereof. In addition, the SLAM module 130 is configured to communicate with another module (not shown), such as a localization module to provide localization features, which includes data relating to a current position of a subject within the geographic region.

In an example embodiment, the semantic map hypothesis generation module 140 is configured to communicate with the SLAM module 130. In this regard, the semantic map hypothesis generation module 140 is configured to obtain and/or receive at least geometric data, traffic data, map data, other relevant data, or any combination thereof from the SLAM module 130 and/or the computer readable medium 110A. In an example embodiment, the semantic map hypothesis generation module 140 includes at least statistical inference software with an application programming interface (API), a domain specific language (DSL), any suitable technology, or any combination thereof. In an example embodiment, the semantic map hypothesis generation module 140 is configured to generate semantic map element hypotheses. More specifically, in an example embodiment, the semantic map hypothesis generation module 140 is configured to generate a probabilistic road model based at least on road elements, map data, geometric data, any relevant data, or any combination thereof. In addition, the semantic map hypothesis generation module 140 is configured to generate at least one probabilistic traffic model based at least on the probabilistic road model, traffic data, any suitable data, or any combination thereof. Also, the semantic map hypothesis generation module 140 is configured to generate at least one estimate of a semantic road model based at least on the probabilistic road model, the probabilistic traffic model, any suitable data, or any combination thereof. In an example embodiment, each estimate of the semantic road model represents a feasible interpretation of the various relevant data (e.g., geometric data, traffic data, etc.) associated with the geographic region. Also, in an example embodiment, the semantic map hypothesis generation module 140 is configured to communicate with the validation module 150.

In an example embodiment, the validation module 150 is configured to evaluate a validity of each estimate of the semantic road model. In this regard, the validation module 150 is configured to select an appropriate hypothesis (e.g., max-likelihood, hypothesis testing, etc.) and/or determine whether or not each estimate of the semantic road model is deemed valid. In this regard, for instance, the validation module 150 is configured to make this validity determination, for instance, by evaluating a result of a comparison with predetermined criteria. In an example embodiment, for instance, the validation module 150 is configured to perform a comparison between traffic prediction data for the estimate of the semantic road model and traffic data from a traffic log of actual traffic for at least one corresponding roadway segment of the geographic region. In this case, the validation module 150 is configured to determine that the estimate of the semantic road model is invalid when there is insufficient correlation between the traffic prediction data and the actual traffic data. Alternatively, the validation module 150 is configured to determine that the estimate of the semantic road model is valid when there is sufficient correlation between the traffic prediction data and the actual traffic data.

In an example embodiment, upon determining that the estimate of the semantic road model is deemed invalid, the validation module 150 is configured to identify road elements and/or semantic data with insufficient correlation and/or relatively high levels of ambiguity with respect to road element type, relationship classification, or the like. After this information has been identified, the validation module 150 is configured to request additional data, which targets the obtainment of this information for further data collection. In this regard, the validation module 150 is advantageously configured to identify areas with insufficient information and provide feedback to the system 100 regarding, for instance, an identification or an estimation of the additional data, which is needed to reach data requirements and/or a more robust estimate of a semantic road model.

In an example embodiment, upon determining that the estimate of the semantic road model is deemed valid, the validation module 150 is configured to generate a semantic map that includes the estimate of the semantic road model. In an example embodiment the generation of the semantic map includes updating an existing map to include the semantic road model or creating a new map that includes the semantic road model. In an example embodiment, the validation module 150 is also configured to store at least this semantic map (and any corresponding data) in at least one computer readable medium 110B. In an example embodiment, the computer readable medium 110B is accessible via at least one other system, which includes hardware, software, or a combination thereof and which provides one or more applications involving the semantic map. For instance, as shown in FIG. 1, the computer readable medium 110B is configured to communicate with another system, which includes a semantic map application 20. In an example embodiment, the semantic map application 20 provides autonomous route planning, navigation features, localization, any suitable mapping related functions, or any combination thereof.

FIG. 2 is a flow chart that illustrates an example of a method that is implemented by the system 100. In an example embodiment, the method is implementable by any suitable hardware technology, software technology, or any combination of hardware and software technology. Also, the method is advantageous in generating one or more semantic maps, which provides various insights regarding one or more map elements. In an example embodiment, the semantic map includes geometric data, localization data, semantic data, other relevant data, or any combination thereof. In this regard, the automated generation of semantic maps is advantageous in various applications including, for example, navigation, route planning, localization, other applications, or any combination thereof. Moreover, the automated generation of semantic maps is advantageous for various entities, such as humans, robots, mobile machines, autonomous driving vehicles, highly autonomous vehicles, etc.

At step 202, in an example embodiment, the system 100 generates a probabilistic road model. In this regard, for instance, the system 100 obtains various relevant data associated with a geographic region from the computer readable medium 110A to generate the probabilistic road model. For example, the system 100 is configured to acquire geometric data relating to the geographic region and provide a probabilistic road model according to this geometric data. In an example embodiment, the probabilistic road model provides a structure that identifies the existence of possible road elements or geographic elements based on the geometric data. Non-limiting examples of road elements or geographic elements include lanes, traffic lights, stop lines, yield points, crosswalks, etc. Additionally or alternatively, the probabilistic road model indicates how these identified elements relate to each other. For instance, in a non-limiting example, based on the geometric data, the probabilistic road model is configured to provide indications of adjacent lanes together with indications of lane change transitions. Also, in accordance with the geometric data, the probabilistic road model is configured to provide indications of lane sequences, as well as the manner in which these lanes are in sequence with each other together with any applicable continuation transitions. As another example, in accordance with the geometric data, the probabilistic road model is configured to provide indications of merging or crossing lanes, as well as the priority of each lane between/among a set of lanes in the same merger or crossing.

At step 204, in an example embodiment, the system 100 generates a probabilistic traffic model for the road model. In an example embodiment, the probabilistic traffic model provides a likelihood of observed traffic behavior for the road model, which was generated at step 202. In this regard, for instance, the probabilistic traffic model indicates a likelihood of traffic behavior given the road model and/or a particular arrangement of semantic road features and relationships.

At step 206, in an example embodiment, the system 100 generates at least one estimate of a semantic road model. In an example embodiment, the system 100 is configured to perform statistical inference involving computations, simulations, analysis, machine learning, any suitable processing, or any combination thereof. Also, in an example embodiment, the statistical inference is performed at least by software that includes an application programming interface (API), a domain specific language (DSL), any suitable technology, or any combination thereof. In an example embodiment, the semantic map hypothesis generation module 140 performs various processing and/or computations for Bayesian Inference, statistical hypothesis testing, any suitable probabilistic/statistical method, or any combination thereof. In this regard, by performing statistical inference (e.g., hypothesis testing), the semantic map hypothesis generation module 140 is configured to manage complexity by considering a set of associations and relationships with a reasonable probability of existing.

In an example embodiment, for instance, upon obtaining the probabilistic road model and the probabilistic traffic model, the system 100 performs processing and/or computations for Bayesian inference to provide a statistical inference result based on the estimate of the semantic road model given observed geometric and traffic data. For example, in a non-limiting scenario, the system 100 is configured to determine that an area between two lane markings has a low probability of being a driving lane, if after a statistically significant number of observations, the traffic data reveals that traffic vehicles never or rarely drive between these two lane markings. Based on traffic data, the system 100 is configured to determine and/or generate output data indicating that this area is more likely to be classified as a non-driving shoulder or median strip than classified as a driving lane. Similarly, if traffic data reveals that a first lane of traffic in an uncontrolled intersection almost never yields to a second lane, the system 100 is configured to determine and/or generate output data indicating that the first lane most likely has priority over at least the second lane based on traffic rules or local customs. In addition, the system 100 is configured to utilize geometric data, such as a stop sign, along with relationship data, such as an association of the stop sign to the second lane, in determining that there is a greater likelihood that this priority relationship exists in which the first lane has priority over the second lane.

At step 208, in an example embodiment, the system 100 determines whether or not the estimate of the semantic road model is valid. In an example embodiment, the system 100 evaluates the validity of the estimate of the semantic road model based on a number of predetermined criteria. In this regard, for instance, the predetermined criteria includes one or more probabilities, likelihood values, confidence levels, threshold values, any statistically significant values, or any combination thereof. More specifically, in an example embodiment, for instance, upon receiving the estimate of the semantic road model from the semantic map hypothesis generation module 140, the validation module 150 is configured to compare traffic prediction data for the estimate of the semantic road model with actual traffic data from a traffic log for that roadway segment and evaluate a result of this comparison with predetermined criteria to determine if the estimate of the semantic road model is valid. Additionally or alternatively, the validation module 150 is configured to perform one or more other validation computations to determine if one or more predetermined criteria are satisfied or not satisfied by the estimate of the semantic road model.

At step 210, in an example embodiment, the system 100 generates a semantic map that includes the estimate of the semantic road model. In this regard, for example, the semantic map generator 120 (e.g., via the semantic map hypothesis generation module 140 and/or the validation module 150) generates this semantic map after the estimate of the semantic road model has been validated at step 208. In an example embodiment, the semantic map is a representation of at least one geographic region, which includes at least semantic data, localization data, map data, geometric data, other relevant data, and any combination thereof. In an example embodiment, the semantic map is advantageous in providing a valid representation of the geographic region with information relating to the identification of various elements of the geographic region and the relationships among the various elements. Also, this semantic map is configured to be output via an I/O device, such as a display device. Additionally or alternatively, this semantic map is configured to connect to or integrate with a semantic map application 20, which is operable to provide route planning, localization, mapping, any relevant application, or any combination thereof.

At step 212, in an example embodiment, the system 100 is configured to request and/or obtain additional data for generating an estimate of the semantic road model and/or a semantic map. For example, as shown in FIGS. 1-2, the system 100 is configured to request additional data upon determining that the estimate of the semantic road model is not valid. By requesting and obtaining the additional data, the system 100 is configured to provide a more robust estimate of the semantic road model in a subsequent iteration. More specifically, upon obtaining this additional data, the system 100 is configured to proceed to step 202 to iterate through this method 200 again, as shown in FIG. 2, to generate another estimate of the semantic road based on this additional data. As such, with this additional data, the system 100 is configured to generate an estimate of a semantic road model, which has a greater likelihood of being deemed valid by the system 100 compared to that of the previous estimate of the semantic road model.

As described above, the method 200 includes assuming a probabilistic road model for how road elements relate to each other and assuming a probabilistic traffic model for how traffic participants interact based on the probabilistic road model. In addition, the method 200 includes generating an estimate of a semantic road model and using logged traffic data to infer which relationships exist and which are active for each road element of the semantic road model. In this regard, the method 200 is advantageous in constructing semantic maps with semantic data, which is applicable in various applications.

FIGS. 3A-3C illustrate non-limiting examples of various map segments pertaining to a geographic region. More specifically, FIG. 3A illustrates a map segment 300, which is generated by the SLAM module 130 and which includes geometric data. In this case, the geometric data includes a first lane marking 302 and a second lane marking 304. Although this map segment 300 indicates the presence of the first lane marking 302 and the second lane marking 304, the map segment 300 does not provide any meaningful information with respect to the first lane marking 302 and the second lane marking 304.

FIG. 3B illustrates a first semantic map segment 310 associated with the same geographic region as that of the map segment 300 of FIG. 3A. In an example embodiment, the first semantic map segment 310 is generated by the semantic map generator 120. In this regard, the system 100 is configured to generate this first semantic map segment 310, for instance, upon validating an estimate of a semantic road model based on traffic data, which indicates that there are generally two flows of traffic in corresponding portions of the geographic region. Also, as shown in FIG. 3B, this first semantic map segment 310 provides meaningful information pertaining to the geometric data and/or road elements. In this regard, for instance, the first semantic map segment 310 includes a first lane identifier 312 to identify a space between the first lane marking 302 and the second lane marking 304 as being a driving lane. In addition, the first semantic map segment 310 includes a second lane identifier 314 to identify a space on an opposite side of the second lane marking 304 as being a driving lane. Also, in an example embodiment, the semantic data of the first semantic map segment 310 includes driving directions for these two driving lanes. In an example embodiment, the system 100 is configured to determine the driving directions based on the traffic data.

FIG. 3C illustrates a second semantic map segment 320 associated with the same geographic region as that of the map segment 300 of FIG. 3A. In an example embodiment, the second semantic map segment 320 is generated by the semantic map generator 120. In this regard, the system 100 is configured to generate this second semantic map segment 320, for instance, upon validating an estimate of a semantic road model based on traffic data, which indicates that there is generally one flow of traffic and occasional vehicle movement in corresponding portions of the geographic region. Also, as shown in FIG. 3C, this second semantic map segment 320 provides meaningful information pertaining to the geometric data and/or road elements. In, this regard, for instance, the second semantic map segment 320 includes a first lane identifier 312 to identify a space between the first lane marking 302 and the second lane marking 304 as being a driving lane. In addition, the second semantic map segment 320 includes a shoulder identifier 322 to identify a space on an opposite side of the second lane marking 304 as being a roadway shoulder or a non-driving shoulder. That is, in contrast to the first semantic map segment 310, the second semantic map segment 320 identifies this space as being a shoulder instead of a driving lane. Also, in an example embodiment, the semantic data of the second semantic map segment 320 further includes driving directions for the first driving lane and the shoulder.

As shown by FIGS. 3B and 3C, there are various feasible interpretations for the geometric data and/or road elements presented in the map segment 300. For example, the first semantic map segment 310 indicates that there are two driving lanes while the second semantic map segment 320 indicates that there is one driving lane and one shoulder. These different interpretations impart or expound different driving practices, rules, and customs, as a driving lane is a driving option whereas a shoulder is more of an emergency option than a driving option. Absent such information, the map segment 300 itself does not provide sufficient information to enable an entity to plan and utilize the road elements in accordance with driving rules and customs. In contrast, each of the first semantic map segment 310 and the second semantic map segment 320 provides insight that enables an entity to plan and utilize at least the road elements in accordance with driving rules and customs.

Figure 4A:
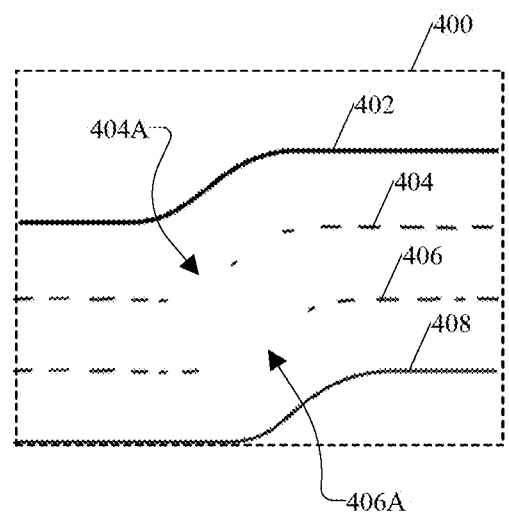
FIG. 4A is a non-limiting example of a map segment for a geographic region according to an example embodiment of this disclosure.
Figure 4B:
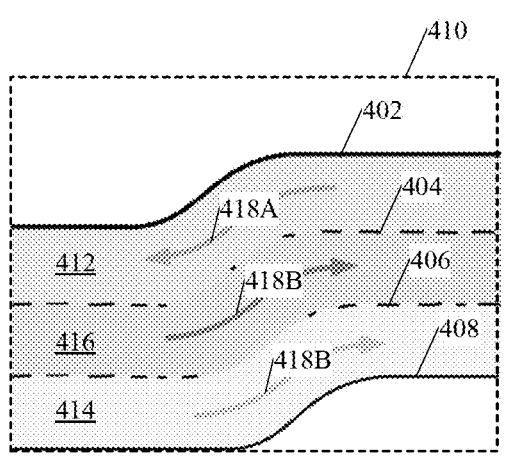
FIG. 4B is a non-limiting example of a semantic map segment with lane segmentation fix the geographic region associated with FIG. 4A according to an example embodiment of this disclosure.
Figure 4C:
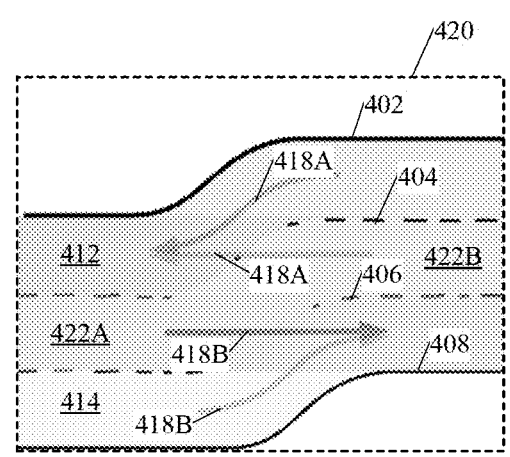
FIG. 4C is another non-limiting example of a semantic map segment with lane segmentation for the geographic region associated with FIG. 4A according to an example embodiment of this disclosure.

FIGS. 4A-4C illustrate non-limiting examples of various map segments pertaining to a geographic region. More specifically, FIG. 4A illustrates a map segment 400, which is generated by the SLAM module 130 and which includes geometric data. In this case, the geometric data includes a first lane marking 402, a second lane marking 404, a third lane marking 406, and a fourth lane marking 408. Additionally, as shown in each of FIGS. 4A-4C, the second lane marking 404 includes a section 404A in which there is a discontinuity in the second lane marking 404 or an interruption with little to no lane markings. Also, as shown in each of FIGS. 4A-4C, the third lane marking 406 includes a section 406A in which there is a discontinuity in the third lane marking 406 or an interruption with little to no lane markings. Although this map segment 400 indicates the presence of the first lane marking 402, the second lane marking 404, the third lane marking 406, and the fourth lane marking 408, the map segment 400 does not provide any meaningful information with respect to the meaning associated with the first lane marking 402, the second lane marking 404, the third lane marking 406, the fourth lane marking 408, the section 406A, and the section 406A.

FIG. 4B illustrates a first semantic map segment 410 associated with the same geographic region as that of the map segment 400 of FIG. 4A. In an example embodiment, the first semantic map segment 410 is generated by the semantic map generator 120. In this regard, the system 100 is configured to generate this first semantic map segment 410, for instance, upon validating an estimate of a semantic road model based on traffic data, which indicates that there are generally one flow of traffic in a first direction 418A and two flows of traffic in a second direction 418B in corresponding portions of the geographic region. Also, as shown in FIG. 4B, this first semantic map segment 410 provides meaningful information pertaining to the geometric data and/or road elements. In this regard, for instance, the first semantic map segment 410 includes a first lane identifier 412 to identify a space between the first lane marking 402 and the second lane marking 404 as being a driving lane. In addition, the first semantic map segment 410 includes a second lane identifier 414 to identify a space between the third lane marking 406 and the fourth lane marking 408 as being a driving lane. Also, between the first lane identifier 412 and the second lane identifier 414, the first map segment includes a third lane identifier 416 to identify a space between the second lane marking 404 and the third lane marking 406 as being a driving lane.

Furthermore, in an example embodiment, the first semantic map segment 410 further includes driving directions for these driving lanes. More specifically, as shown in FIG. 4B, the first driving lane, associated with first lane identifier 412, includes a first direction 418A. Meanwhile, as shown in FIG. 4B, the second and third driving lanes, associated with second and third lane identifiers 414 and 416, includes a second direction 418B, which is opposite to the first direction 418A. In this regard, the inclusion of driving directions is highly advantageous for various semantic map applications 20, such as highly-automated driving applications, autonomous driving applications, navigation applications, and other applications.

FIG. 4C illustrates a second semantic map segment 420 associated with the same geographic region as that of the map segment 400 of FIG. 4A. In an example embodiment, the second semantic map segment 420 is generated by the semantic map generator 120. In this regard, the system 100 is configured to generate this second semantic map segment 420, for instance, upon validating an estimate of a semantic road model based on traffic data, which indicates that there are generally two flows of traffic that merge into a single flow of traffic in a first direction 418A and another two flows of traffic that merge into a single flow of traffic in a second direction 418B in corresponding portions of the geographic region. Also, as shown in FIG. 4C, this second semantic map segment 420 provides meaningful information pertaining to the geometric data and/or road elements. The second semantic map segment 420 includes a first lane identifier 412 to identify a space between the first lane marking 402 and the second lane marking 404 as being a driving lane. In addition, the second map segment 420 includes a second lane identifier 414 to identify a space between the third lane marking 406 and the fourth lane marking 408 as being a driving lane. Also, in contrast to the first semantic map segment 410, for the space between the second lane marking 404 and of the third lane marking 406, the second semantic map segment 420 includes a third lane identifier 422A for a part of that space and a fourth lane identifier 422B for another part of that space. In this regard, the second semantic map segment 420 ascribes a different meaning to the sections 404A and 406A involving the discontinuities or interruptions in the second lane marking 404 and the third lane marking 406 compared to that of the first map segment 410. More specifically, as shown in FIG. 4C, the second semantic map segment 420 identifies the geometric data of the map segment 300 as including the first lane 412 in the first direction 418A and the second lane 414 in the second direction 418B, but further includes an interpretation that there is a merger between the first lane 412 and the fourth lane 422B and a merger between the second lane 414 and the third lane 422A. In this regard, the first lane 412 and the fourth lane 422B are associated with travel that is predominately in the first direction 418A while the second lane 414 and the third lane 422A are associated with travel that is predominately in the second direction 418B.

As shown by FIGS. 4B and 4C, there are various feasible interpretations for the geometric data and/or road elements presented in the map segment 400. For example, the first semantic map segment 410 indicates that there are three driving lanes with one driving lane in a first direction 418A and two driving lanes in a second direction 418B. Meanwhile, the second semantic map segment 420 indicates that there are two lanes that merge into a single lane in a first direction 418A and two lanes that merge into a single lane in a second direction 418B. These different interpretations impart or expound different driving practices, rules, and customs, as three driving lanes is different from two merging sections. Absent such information, the map segment 400 itself does not provide sufficient information to enable an entity to plan and utilize the road elements in accordance with driving rules and customs. In contrast, each of the first semantic map segment 410 and the second semantic map segment 420 provides insight that enables an entity to plan and utilize the road elements in accordance with driving rules and customs.

Figure 5A:
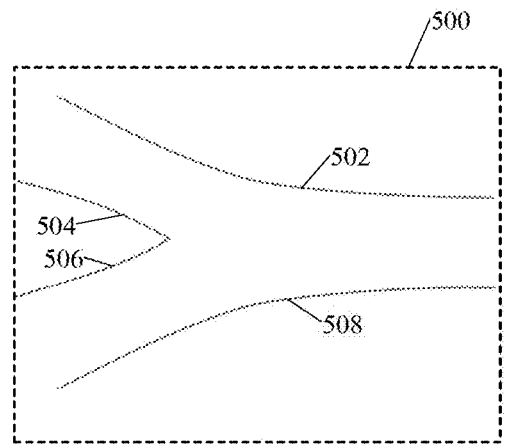
FIG. 5A is a non-limiting example of a map segment for a geographic region according to an example embodiment of this disclosure.
Figure 5B:
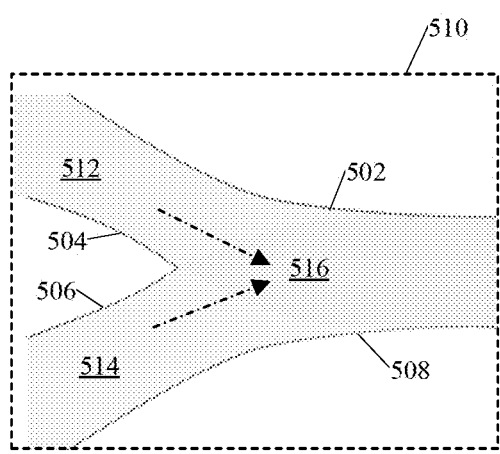
FIG. 5B is a non-limiting example of a semantic map segment with lane merge relations for the geographic region associated with FIG. 5A according to an example embodiment of this disclosure.
Figure 5C:
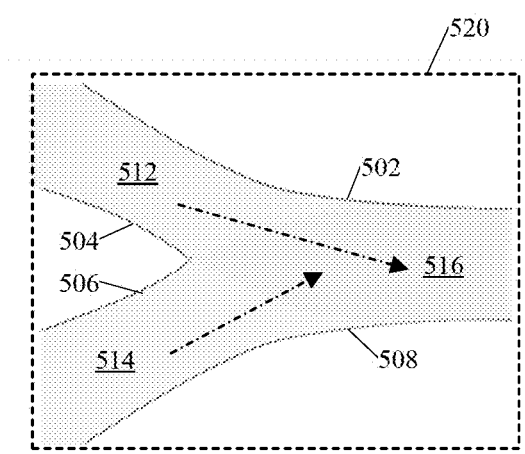
FIG. 5C is another non-limiting example of a semantic map segment with lane merge relations for the geographic region associated with FIG. 5A according to an example embodiment of this disclosure.

FIGS. 5A-5C illustrate non-limiting examples of various map segments pertaining to a geographic region. More specifically, FIG. 5A illustrates a map segment 500, which is generated by the SLAM module 130 and which includes geometric data. In this case, the geometric data includes a first lane marking 502, a second lane marking 504, a third lane marking 506, and a fourth lane marking 508. Although this map segment 500 indicates the presence of the first lane marking 502, the second lane marking 504, the third lane marking 506, and the fourth lane marking 508, the map segment 300 does not provide any meaningful information with respect to the first lane marking 502, the second lane marking 504, the third lane marking 506, and the fourth lane marking 508.

FIG. 5B illustrates a first semantic map segment 510 associated with the same geographic region as that of the map segment 500 of FIG. 5A. In an example embodiment, the first semantic map segment 510 is generated by the semantic map generator 120. In this regard, the system 100 is configured to generate this first semantic map segment 510, for instance, upon validating an estimate of a semantic road model based on traffic data, which indicates that there are generally two flows of traffic that merge into a single lane with similar priority in corresponding portions of the geographic region. Also, as shown in FIG. 5B, this first semantic map segment 510 provides meaningful information pertaining to the geometric data and/or road elements. In this regard, for instance, the first semantic map segment 510 includes a first lane identifier 512 to identify a space between the first lane marking 502 and the second lane marking 504 as being a driving lane. In addition, the first semantic map segment 510 includes a second lane identifier 514 to identify a space between the third lane marking 506 and the fourth lane marking 508 as being a driving lane. Also, the first semantic map segment 510 includes a third lane identifier 516 to identify a space between the first lane marking 502 and the fourth lane marking 508 as being a driving lane. Moreover, this first semantic map segment 510 also indicates that the first driving lane 512 and the second driving lane 514 have equal priority with respect to merging into the third driving lane 516.

FIG. 5C illustrates a second semantic map segment 520 associated with the same geographic region as that of the map segment 500 of FIG. 5A. In an example embodiment, the second semantic map segment 520 is generated by the semantic map generator 120. In this regard, the system 100 is configured to generate this second semantic map segment 520, for instance, upon validating an estimate of a semantic road model based on traffic data, which indicates that there are generally two flows of traffic that merge into a single lane in which the first lane appears to have precedence over the second lane in corresponding portions of the geographic region. Also, as shown in FIG. 5C, this second semantic map segment 520 provides meaningful information pertaining to the geometric data and/or road elements. Similarly to the first semantic map segment 510, the second semantic map segment 520 includes the first lane identifier 512, the second lane identifier 514, and the third lane identifier 516. However, in contrast to the first semantic map segment 510, the second semantic map segment 520 indicates that the first driving lane, associated with the first lane identifier 512, has priority over the second driving lane, associated with the second lane identifier 514, when merging into the third lane 516. In this regard, the second semantic map segment 520 ascribes a different meaning to the merger of the first driving lane and the second driving lane compared to that of the first semantic map segment 510. Also, as shown in FIG. 5C, the second semantic map segment 520 identifies the predominant or main driving directions of each of the first, second, and third driving lanes.

As shown by FIGS. 5B and 5C, there are various feasible interpretations for the geometric data and/or road elements presented in the map segment 500. For example, the first semantic map segment 510 indicates that there are two lanes that merge with equal priority into a single lane. Meanwhile, the second semantic map segment 520 indicates that there are two lanes that merge into a single lane in which a first lane has priority over the second lane. These different interpretations impart or expound different driving practices, rules, and customs. Absent such information, the map segment 300 itself does not provide sufficient information to enable an entity to plan and utilize the road elements in accordance with driving rules and customs. In contrast, each of the first semantic map segment 510 and the second semantic map segment 520 provides insight that enables an entity to plan and utilize the road elements in accordance with driving rules and customs.

Figure 6A:
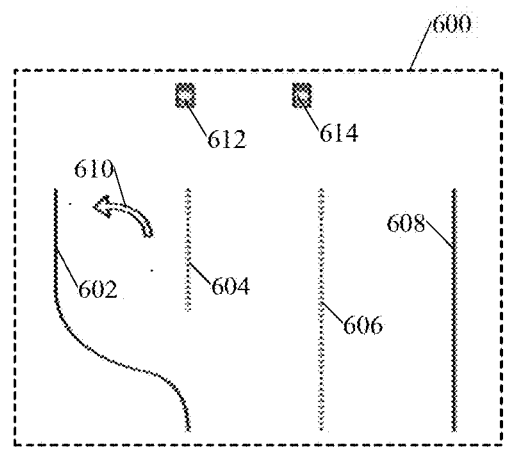
FIG. 6A is a non-limiting example of a map segment for a geographic region according to an example embodiment of this disclosure.
Figure 6B:
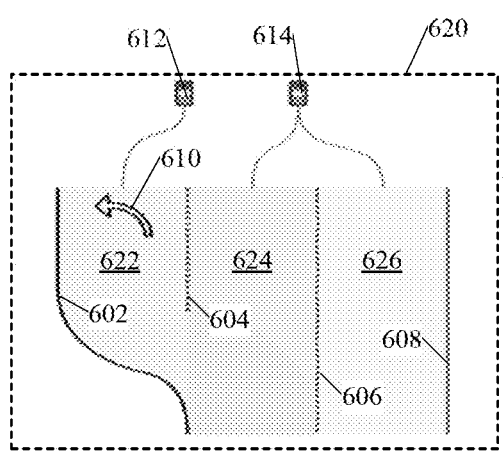
FIG. 6B is a non-limiting example of a semantic map segment with traffic light association for the geographic region associated with FIG. 6A according to an example embodiment of this disclosure.
Figure 6C:
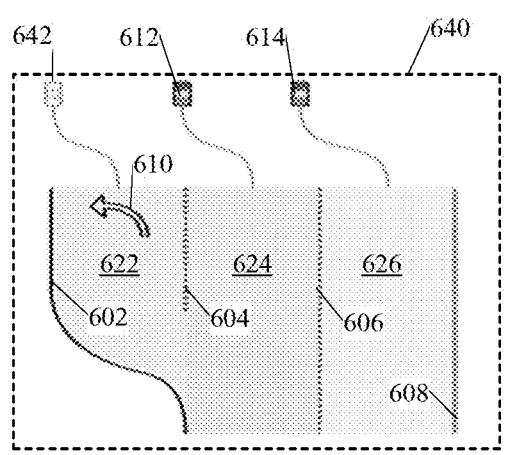
FIG. 6C is another non-limiting example of a semantic map segment with traffic light association for the geographic region associated with FIG. 6A according to an example embodiment of this disclosure.

FIGS. 6A-6C illustrate non-limiting examples of various map segments pertaining to a geographic region. More specifically, FIG. 6A illustrates a map segment 600, which is generated by the SLAM module 130 and which includes geometric data. In this case, the geometric data includes a first lane marking 602, a second lane marking 604, a third lane marking 606, and a fourth lane marking 608. In addition, the map segment 600 indicates that there is a left turn arrow 610 between the first lane marking 602 and the second lane marking 604. The map segment 600 also indicates that there is a first traffic light 612 and a second traffic light 614. Although this map segment 300 indicates the presence of the first lane marking 602, the second lane marking 604, the third lane marking 606, the fourth lane marking 608, the left turn arrow 610, the first traffic light 612, and the second traffic light 614, the map segment 300 does not provide any meaningful information with respect to the this geometric data and/or road elements.

FIG. 6B illustrates a first semantic map segment 620 associated with the same geographic region as that of the map segment 600 of FIG. 6A. In an example embodiment, the first semantic map segment 620 is generated by the semantic map generator 120. In this regard, the system 100 is configured to generate this first semantic map segment 620, for instance, upon validating an estimate of a semantic road model based on traffic data, which indicates that a lane turns left in accordance with a traffic light and two adjacent lanes exhibit similar behavior in accordance with another traffic light in corresponding portions of the geographic region. Also, as shown in FIG. 6B, this first semantic map segment 620 provides meaningful information pertaining to the geometric data and/or road elements. In this regard, for instance, the first semantic map segment 620 includes a first lane identifier 622 to identify a space between the first lane marking 602 and the second lane marking 604 as being a turning lane. In addition, the first semantic map segment 620 includes a second lane identifier 624 to identify a space between the second lane marking 604 and the third lane marking 606 as being a driving lane. Also, the first semantic map segment 620 includes a third lane identifier 626 to identify a space between the third lane marking 606 and the fourth lane marking 608 as being a driving lane. Moreover, this first semantic map segment 620 also indicates a relationship between the first traffic light 612 and the second traffic light in relation to the first lane 622, the second lane 624, and the third lane 626. More specifically, as shown in FIG. 6B, the first semantic map segment 620 associates the first traffic light 612 with the first lane 622. In addition, as shown in FIG. 6B, the first semantic map segment 620 associates the second traffic light 614 with the second lane 624 and the third lane 626. Also, the first semantic map segment 620 includes driving directions for each of the first, second, and third lanes.

FIG. 6C illustrates a second semantic map segment 640 associated with the same geographic region as that of the map segment 600 of FIG. 6A. In an example embodiment, the second semantic map segment 640 is generated by the semantic map generator 120. In this regard, the system 100 is configured to generate this second semantic map segment 640, for instance, upon validating an estimate of a semantic road model based on traffic data, which indicates that a lane turns left in accordance with a traffic light and two adjacent lanes exhibit different behavior in corresponding portions of the geographic region. Also, as shown in FIG. 6C, this second semantic map segment 640 provides meaningful information pertaining to the geometric data and/or road elements. Similarly to the first semantic map segment 620, this second semantic map segment 640 includes the first lane identifier 622, the second lane identifier 624, and the third lane identifier 626. However, in contrast to the first semantic map segment 620, the second semantic map segment 640 provides a different relationship between the first traffic light 612 and the second traffic light 614 in relation to the first lane 622, the second lane 624, and the third lane 626. More specifically, as shown in FIG. 6C, the second semantic map segment 640 associates the first traffic light 612 with only the second lane 624. In addition, as shown in FIG. 6C, the second semantic map segment 640 associates the second traffic light 614 with only the third lane 626. Furthermore, the second semantic map segment 640 introduces a third traffic light 642, which was not detected by the sensors during the data collection process 10 and is not provided as a part of the geometric data of the map segment 600. Also, as shown in FIG. 6C, the second semantic map segment 640 associates the third traffic light 642 with the first lane 622. In this regard, the system 100 is configured to infer that the third traffic light 642 exists based on an analysis of the relevant data (e.g., traffic data, geometric data, etc.) for this geographic region. As demonstrated by this non-limiting example, the system 100 is configured to generate a semantic map and include undetected elements, such as the third traffic light 642, which may have been missed by one of more of the sensors due to an obstruction, a sensor error, or various factors.

As shown by FIGS. 6B and 6C, there are various feasible interpretations for the geometric data and/or road elements presented in the map segment 600. For example, the first semantic map segment 620 indicates that the middle lane and the left lane are controlled by the same traffic light 614. Meanwhile, the second semantic map segment 640 indicates that each of the three lanes is controlled by its own traffic light. These different interpretations impart or expound different driving practices, rules, and customs. Absent such information, the map segment 600 itself does not provide sufficient information to enable an entity to plan and utilize the road elements in accordance with driving rules and customs. In contrast, each of the first semantic map segment 620 and the second semantic map segment 640 provides insight that enables an entity to plan and utilize the road elements in accordance with driving rules and customs.

As described above, the system 100 provides a number of advantageous features, as well as benefits. For example, the system 100 is advantageously configured to automatically or semi-automatically generate at least one estimate of a semantic road model. In addition, the system 100 is configured to check a validity of the estimate of the semantic road model. Also, the system 100 is configured to provide statistical information regarding the relevancy, confidence, and/or relations between various map elements. Furthermore, the system 100 is applicable and/or implementable with a compositional map model.

In addition, the system 100 is configured to generate a semantic map that is advantageous in providing meaning and insight with respect to various map elements. In addition, the system 100 is configured to provide a suitable confidence level for semantic interpretation. In addition, the system 100 is configured to identify semantic elements with relatively high uncertainty (in terms of existence probabilities of elements and relationships) or high ambiguity (in terms of element type or relationship classification) and request further data collection for these semantic elements. The system 100 is also able to provide automatic relevancy detection, for instance, by identifying semantic features with very little correlation to observed traffic behavior as being potentially unimportant. Additionally, the system 100 is configured to quantify data requirements for achieving a valid semantic road model by identifying relevant sections with insufficient information while also requesting and/or obtaining the necessary data for achieving this valid semantic road model. Furthermore, the system 100 is configured to provide this automated semantic map generation without requiring handcrafted processes.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A method comprising:
generating, via a processing system with at least one processing device, a probabilistic road model based on road elements associated with geometric data corresponding to a geographic region;
generating, via the processing system, a probabilistic traffic model for the road model;
computing, via the processing system, a statistical inference result based on the road model and the traffic model; and
generating, via the processing system, an estimate of a semantic road model based on the statistical inference result.

2. The method of claim 1, wherein the statistical inference result is computed via Bayesian Inference or statistical hypothesis testing.

3. The method of claim 1, wherein:
the probabilistic road model includes a probabilistic structure with (i) identification data that identifies road elements based on geographic elements and (ii) relationship data that identifies relationships between the road elements; and
the probabilistic traffic model includes a likelihood of traffic behavior for the road model.

4. The method of claim 3, wherein:
the identification data includes lane identifiers, shoulder identifiers, median strip identifiers, sign identifiers, and traffic-light identifiers;
the relationship data includes lane priority data, lane merging data, driving direction data, first association data, and second association data;
the first association data includes associations between the sign identifiers and the lane identifiers; and
the second association data includes associations between the traffic-light identifiers and the lane identifiers.

5. The method of claim 1, further comprising:
generating, via the processing system, a semantic map that includes the estimate of the semantic road model.

6. The method of claim 5, further comprising:
storing the semantic map in at least one computer readable medium that is accessible to a computer module that is operable to perform autonomous route planning based on the estimate of the semantic road model.

7. The method of claim 1, further comprising:
determining, via the processing system, whether the estimate of the semantic road model is invalid or valid;
obtaining, via the processing system, additional data relating to the geographic region upon determining that the estimate of the semantic road model is invalid; and
generating, via the processing system, a semantic map that includes the estimate of the semantic road model upon determining that the estimate of the semantic road model is valid.

8. The method of claim 7, wherein the step of determining whether the estimate of the semantic road model is invalid or valid includes evaluating a result of a comparison with threshold criteria, the comparison being between traffic prediction data for the estimate of the semantic road model and a traffic log of actual traffic for at least one corresponding roadway segment of the geographic region.

9. The method of claim 1, further comprising:
obtaining, via the processing system, geometric data for a geographic region; and
obtaining, via the processing system, traffic data for the geographic region;
wherein:
the probabilistic road model is generated based at least on the geometric data; and
the probabilistic traffic model is generated based at least on the traffic data and the probabilistic road model.

10. A system for automated semantic map generation, the system comprising:
at least one computer readable medium that stores geometric data, traffic data, and computer readable data;
a processing system communicatively connected to the at least one computer readable medium, the processing system including at least one processing device and being configured to execute the computer readable data to implement a method that includes:
generating a probabilistic road model for road elements based on the geometric data corresponding to a geographic region;

generating a probabilistic traffic model for the road model;
computing a statistical inference result based on the road model and the traffic model;
generating an estimate of a semantic road model based on the statistical inference; and
generating a semantic map that includes the estimate of the semantic road model.

11. The system of claim 10, wherein the statistical inference result is computed via Bayesian Inference or statistical hypothesis testing.

12. The system of claim 10, wherein:
the probabilistic road model includes a probabilistic structure with (i) identification data that identifies road elements based on the geometric data and (ii) relationship data that indicates relationships between the road elements; and
the probabilistic traffic model includes a likelihood of traffic behavior for the road model.

13. The system of claim 10, wherein the processing system is configured to store the semantic map in the at least one computer readable medium so that a computer module is operable to obtain the semantic map from the at least one computer readable medium and perform autonomous route planning based on the semantic map.

14. A non-transitory computer readable medium comprising computer readable data, which, when executed by a processing system including at least one processing device, is configured to implement a method comprising:
generating a probabilistic road model for road elements based on geometric data corresponding to a geographic region;
generating a probabilistic traffic model for the road model;
computing a statistical inference result based on the road model and the traffic model; and
generating an estimate of a semantic road model based on the statistical inference result.

15. The computer readable medium of claim 14, wherein the statistical inference result is computed via Bayesian Inference or statistical hypothesis testing.

16. The computer readable medium of claim 14, wherein:
the probabilistic road model includes a probabilistic structure with (i) identification data that identifies road elements based on the geometric data and (ii) relationship data that indicates relationships between the road elements; and
the probabilistic traffic model includes a likelihood of traffic behavior for the road model.

17. The computer readable medium of claim 14, wherein the method further comprises:
generating, via the processing system, a semantic map that includes the estimate of the semantic road model.

18. The computer readable medium of claim 14, wherein the method further comprises:
determining, via the processing system, whether the estimate of the semantic road model is invalid or valid;
requesting, via the processing system, additional data relating to the geographic region upon determining that the estimate of the semantic road model is invalid; and
generating, via the processing system, a semantic map that includes the estimate of the semantic road model upon determining that the estimate of the semantic road model is valid.

19. The computer readable medium of claim 18, wherein the step of determining whether the estimate of the semantic road model is invalid or valid includes evaluating a result of a comparison with threshold criteria, the comparison being between traffic prediction data for the estimate of the semantic road model and a traffic log of actual traffic for at least one corresponding roadway segment of the geographic region.

20. The computer readable medium of claim 14, wherein the method further comprises:
generating additional road elements based on traffic data to account for traffic behavior;
wherein:
the traffic data includes a traffic log of actual traffic for at least one corresponding roadway segment of the geographic region.

* * * * *